RECORDING AND REPRODUCING ANGULARLY CORRELATED DATA

Filed June 28, 1954 2 Sheets-Sheet 1

INVENTORS
MARK V. MECHLER
GEORGE W. WOOD
BY George Sipkin
Kolla N. Carter
ATTORNEYS Nov. 18, 1958 M. V. MECHLER ET AL 2,861,255

RECORDING AND REPRODUCING ANGULARLY CORRELATED DATA

Filed June 28, 1954 2 Sheets-Sheet 2

INVENTORS
MARK V. MECHLER
GEORGE W. WOOD
BY George Lipkin
Rollo N. Carter
ATTORNEYS

United States Patent Office 2,861,255

Patented Nov. 18, 1958

2,861,255

RECORDING AND REPRODUCING ANGULARLY CORRELATED DATA

Mark V. Mechler, Austin, Tex., and George W. Wood, Warrensburg, Mo., assignors, by mesne assignments, to the United States of America as represented by the Secretary of the Navy Application June 28, 1954, Serial No. 439,944

3 Claims. (Cl. 340—3)

The invention described herein may be manufactured and used by or for the Government of the United States of America for governmental purposes without the payment of any royalties thereon or therefor.

The present invention relates to the recording of angular displacement in terms of phase displaced signals and more particularly to the recording of two correlated sets of changing dimensional information, such as the range and corresponding bearing of a target presented by a sonar system.

The invention is of especial utility in studying the performance of systems whose terminal products are ephemeral and, hence, not available for evaluation purposes. An example of such a system is found in sound echo ranging and bearing apparatus and the invention will be described in connection with such apparatus.

An object of the invention is the provision of a method and apparatus for recording and reproducing in correlated form the range and bearing data provided by an underwater sound echo target locating system.

Another object of the invention is the provision of circuit arrangement for translating angular displacement into electric signals suitable to be recorded magnetically.

Figure 1:
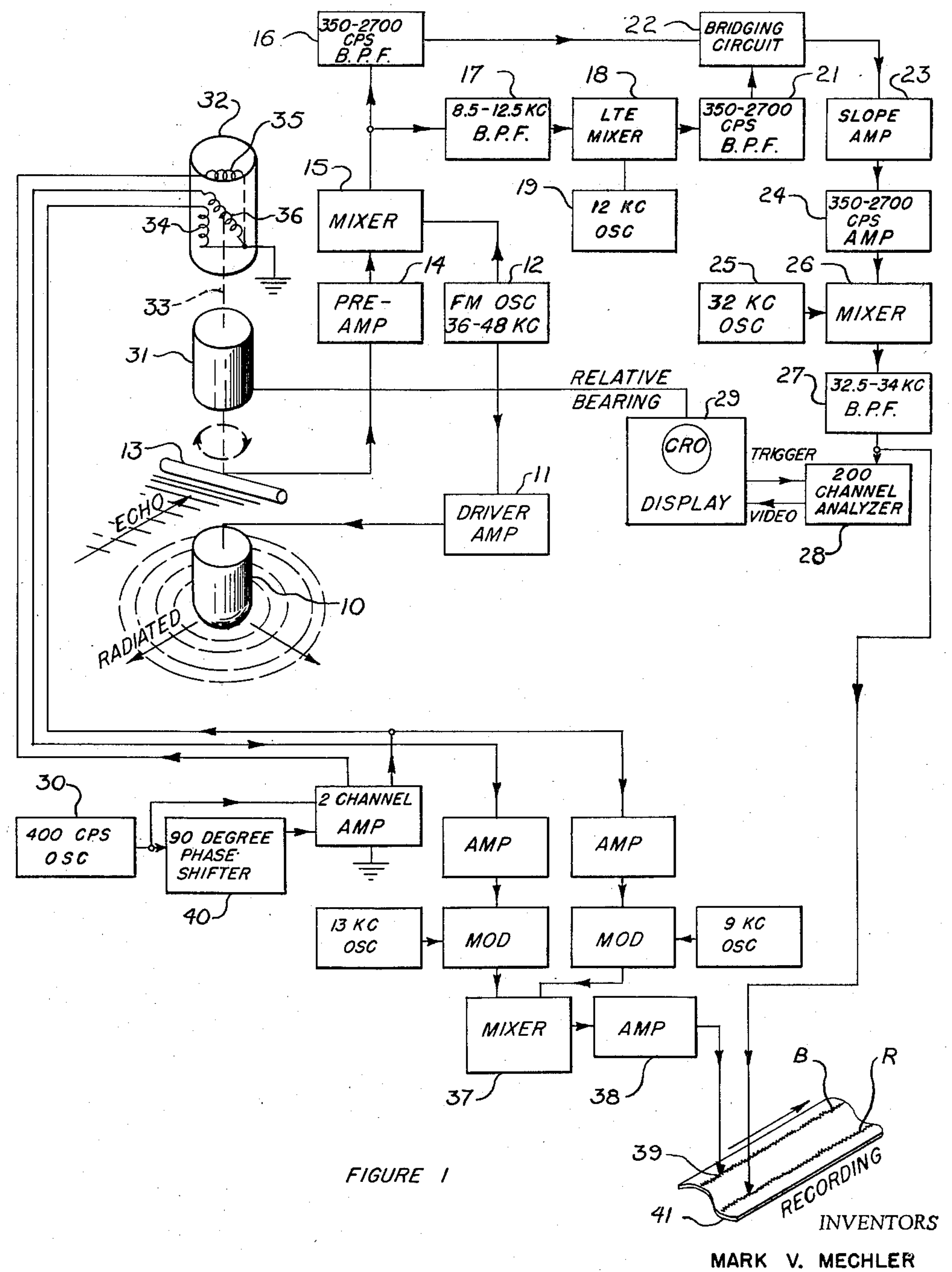
Figure 2:
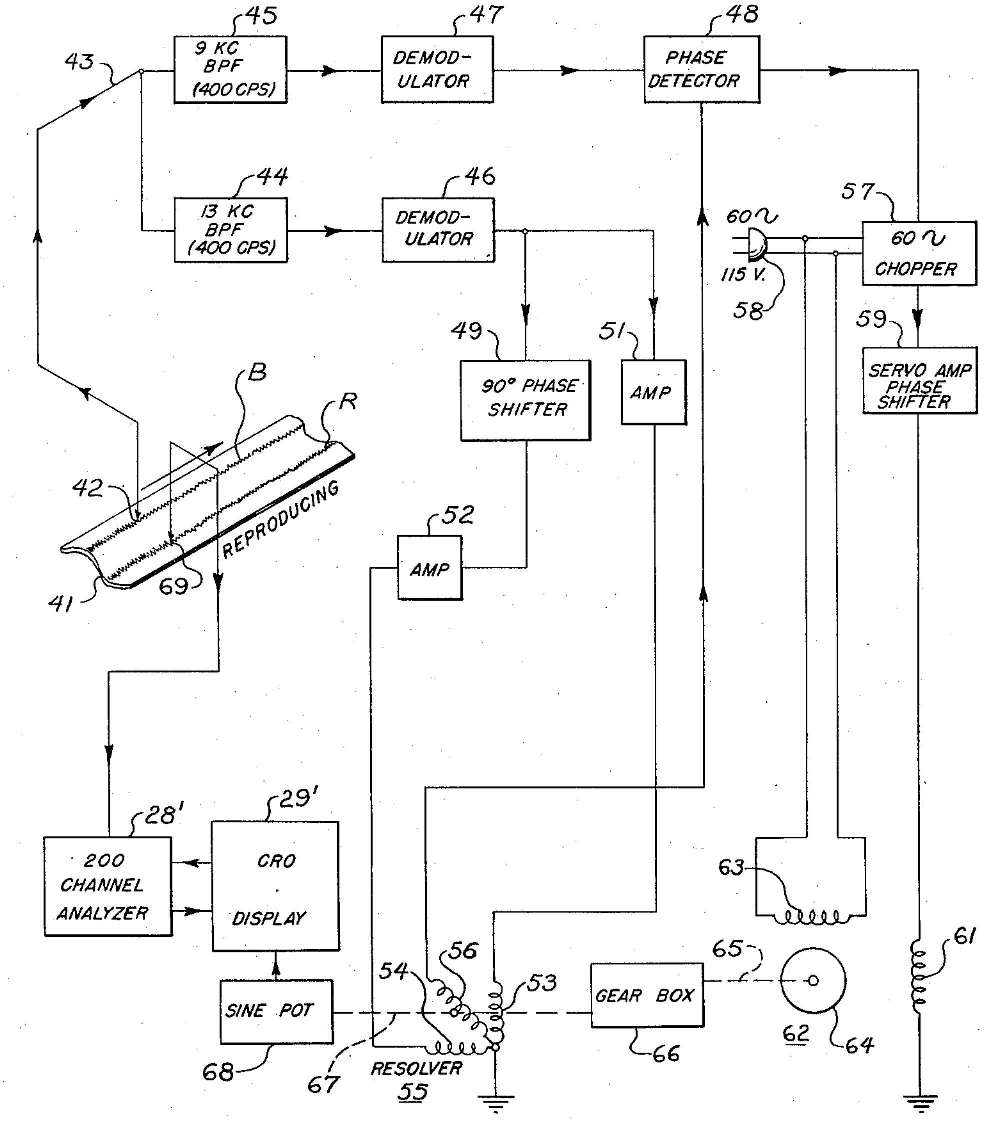

Other objects and advantages of the invention will become evident from the following description when read in connection with the accompanying drawings in which:

Fig. 1 shows an arrangement according to the invention for recording range and bearing data gathered by a frequency modulated sonar; and Fig. 2 shows a circuit arrangement suitable for reproducing the records obtained by the arrangement of Fig. 1.

In accordance with the invention the recording of range data presented by a frequency modulated sonar system is accomplished by recording the beat frequency appearing at the input of the analyzers on one track of a dual track strip storage medium while the recording of the bearing data is simultaneously accomplished by deriving two low frequency signals differing in phase as a linear function of the bearing, one of which signals is used to modulate a local oscillator of one frequency while the other signal is used to modulate a local oscillator of a different frequency, the two modulated frequencies being mixed and applied to a recording head which records the combined signals along the other track of the recording medium. The range and bearing data thus recorded are available for subsequent reproduction and analysis for evaluating the performance of the system, comparison of two or more systems, and determining the skill of the operator in observing the information as originally presented.

In Fig. 1 a recording arrangement according to the invention is shown as applied to a frequency modulated underwater sound echo range equipment having an omnidirectional transducer 10 driven through an amplifier 11 from a oscillator 12 which is saw tooth frequency modulated as for instance between thirty-six and forty-eight kilocycles. A directional transducer such as a hydrophone 13 rotates in azimuth to receive echoes which may be reflected from a target. The frequency of the sound echo under static conditions will be the same as the frequency radiated, but will differ from the frequency being radiated at the instant of receipt of the echo by an amount determined by the total travel time of the sound and the rate of change of frequency being radiated, thus this frequency difference is a measure of the range of the target from which the echo emanated. The signal derived from the echo by the hydrophone 13 is fed through an amplifier 14 and heterodyned against the frequency modulated oscillator 12 in a mixer 15, the output of which is fed to the common input of two channels, one of which contains a band pass filter 16 for the normal beat frequency signal and the other of which contains a band pass filter 17 for the flyback beat frequency signal which feeds through a lost time eliminator 18 where it is heterodyned against the output of a twelve kilocycle oscillator 19 to reduce it to the same frequency as the normal beat frequency signal and through a filter 21 to a bridging circuit 22 where the two beat signals are combined. The combined signals are fed through a slope amplifier 23 and another filter 24, heterodyned with a thirty-two kilocycle oscillator 25 in a mixer 26 and thence through a filter 27 to a two hundred channel analyzer 28 which provides the video signal for the cathode ray oscilloscope of a display assembly 29. A sine potentiometer 31 which rotates in assembly with the hydrophone 13 provides the relative bearing signal to the display assembly 29 in a well known manner.

In accordance with the invention, a resolver 32 has its armature shaft 33 arranged to be rotated in assembly with the scanning hydrophone 13 and the sine pot 31 and has its stator windings 34 and 35 energized in such a manner as to provide two outputs differing in phase in accordance with the angular position of the armature 36 carried on the shaft 33. This may be accomplished by energizing the stator windings 34 and 35 of the resolver 32 with currents from a 400 C. P. S. oscillator 30, the current supplied to one stator winding being phase displaced by 90° with reference to the other by a phase shifting circuit 40, whereby the phase displacement between the voltage appearing across a stator winding and that induced in the armature winding 36 is representative of the angular position of the armature 36 measured from a fixed reference position. Because the phase shifted signal induced in the armature 36 and the voltage developed across one of the stator windings (winding 34 is here used) have the same frequency they are separably combined into a common channel by employing them to modulate different frequencies (such as 13 kc. and 9 kc.) and then transmitting them simultaneously through a mixer circuit 37 and a common channel amplifier 38 to a recording head 39 which imposes the signal along one path B on a recording tape 41. The other path R on the recording tape 41 may be recorded using directly the signal input of the channel analyzer 28. Magnetic recording is preferred but other record mediums may of course be employed.

As will be described in connection with Fig. 2, when the record is reproduced the output from the track B contains superposed components of the two modulated carrier frequencies which are separated by suitable filters and demodulated. One of the 400 cycle signals thus obtained represents the reference phase while the other represents the variable phase aspect of the recorded bearing information. By phase detection and a servo-mechanism relative bearing information is obtained for controlling a display console.

As shown in Fig. 2 a reproducing head 42 cooperating with the record track B provides on its output lead 43 a voltage containing superposed components of the modulated 13 kc. and 9 kc. carrier frequencies which are separated by band pass filters 44 and 45 whose center frequencies are 13 kc. and 9 kc., respectively. The outputs of the filters 44 and 45 are passed through demodulators 46 and 47, respectively, to obtain the 400 cycle modulation envelopes of the two carriers, the phase difference of which represents the angle information originally recorded.

In recording the record track B as described in connection with Fig. 1, the signal derived from the stator winding 34 of the resolver 32 was employed to modulate a 9 kc. carrier while the signal developed in the armature 36 of the resolver 32 was employed to modulate a 13 kc. carrier. It is therefore evident that the 9 kc. component reproduced from the record track B is representative of the ship's heading while the 13 kc. reproduced signal represents the transducer's bearing relative to the ship's heading. Thus, the phase of the 400 cycle envelope obtained from the 9 kc. carrier may be considered the reference about which the phase of the 400 cycle envelope obtained from the 13 kc. carrier varies.

The reference phase 400 cycle signal is fed directly to one input of a standard servo phase detector 48. The variable phase 400 cycle signal is divided into two signals which are phase displaced by 90° by passing one of the signals through a phase shifter 49, and then passed through amplifiers 51 and 52 to the stator windings 53 and 54 of a resolver 55. The voltage induced in the armature 56 of the resolver 55 is applied to the other input of the servo phase detector 48, the output of which is a D. C. voltage whose magnitude and sign vary in one-to-one correspondence with the phase relation of the two signals applied to its input terminals. The D. C. output voltage of the phase detector 48 is fed through a 60 cycle servo chopper 57 driven by commercial current (as from a wall plug 58), and through a phase shifting amplifier 59 to one field winding 61 of a servomotor 62, the other field winding 63 of which is connected in parallel with the chopper 57 to the wall plug 58, the phase shifting being such that the voltages applied to the two field windings 61 and 63 are 90° out of phase. The rotor 64 of the servomotor 62 is coupled mechanically through its shaft 65 and a suitable gear train 66 (e. g., 50 to 1 gear ratio) to a shaft 67 common to both the resolver armature 56 and a sine potentiometer 68. Hence for any given phase relation between the 400 cycle modulation envelopes recovered by the demodulators 46 and 47 there exists a unique angular position of armature 56 of the resolver 55 to which position it is moved at all times by the servomotor 62.

The only components of the sonar set of Fig. 1 necessary for a re-display of the recorded information are the cathode ray presentation console 29' and the analyzer rack 28', the output of the servo driven sine potentiometer 68 being connected to the relative bearing circuitry of the display console 29' and the range information taken off the record track R by a reproducing head 69 being introduced to the input of the analyzer rack 28'.

It is thus apparent that the information reproduced on the console 29' duplicates the target range and relative bearing originally displayed during recording so that the data can be studied and re-studied at leisure for any desired purpose. If the voice of the operator is also recorded and reproduced along with the sonar data the evaluation of the operator's skill is greatly facilitated.

Although the invention has been described as applied to a particular sonar system operating with a circular scan, it will be evident that similar information from sector scanning is equally recordable and reproducible, and that other synergetic signals impressed with a varying angle aspect may be recorded in reproducible form by a similar technique.

Many modifications will be obvious to those skilled in the art for adapting the invention to other specific applications and it is intended to include all such modifications within the scope of the appended claims.

What is claimed is:

1. The combination with the receiver of a sonar system having at least a receiving transducer rotatable in azimuth and means for producing a signal having a frequency proportional to range, means for rotating said transducer in azimuth, a source of low frequency oscillations, means for deriving from said oscillations two output signals differing in phase in accordance with the azimuthal position of the receiving transducer, individual means for separately supplying the two output signals with carrier waves of different frequencies, means for mixing the two output signals, and means for recording the range signal and the mixed output signals along parallel tracks on a strip record medium.

2. In a system for analyzing the performance of an echo-ranging object locating system in which an omnidirectional transducer emits wave energy and a directionally sensitive transducer cyclically scans the reflected echo of the wave energy the combination of means for transforming the angular position of the scanning transducer into a phase shifted output and an unshifted phase output of a low frequency signal, means for providing a carrier of one frequency modulated by the phase shifted output signal, means for providing a carrier of another frequency modulated by the unshifted phase output signal, means for mixing the two modulated carriers, means responsive to the travel time of a reflected echo for deriving a range signal, means for separately recording the mixed modulated carriers and the range signal, means for separately reproducing the carriers and the range signal, means for separating into separate channels the modulation envelopes of the carriers, a sine potentiometer, an electrical servo-mechanism responsive to the modulation envelopes for adjusting the sine potentiometer in strict accordance with their phase relation, and presentation means controlled by the range signal and the sine potentiometer for displaying the range and bearing information represented by the recorded signals.

3. In a system for evaluating the skill of an operator in interpreting the cathode ray oscilloscope presentation of an echo-ranging object locating apparatus, the recording combination according to claim 1 together with a reproducer comprising means for separately reproducing from the strip record medium the range signal and the mixed output signals, a cathode ray oscilloscope display assembly, analyzer means responsive to the reproduced range signal for applying a video signal to said display assembly, and phase sensitive detector means responsive to the reproduced mixed output signals for applying to said display assembly a signal representing the relative bearing information contained in said output signals.

References Cited in the file of this patent

UNITED STATES PATENTS

| | | |
|---|---|---|
| 2,475,245 | Leaver et al. | July 5, 1949 |
| 2,475,363 | Turner | July 5, 1949 |
| 2,536,771 | Rost et al. | Jan. 2, 1951 |
| 2,537,770 | Livingston et al. | Jan. 9, 1951 |
| 2,698,410 | Madsen et al. | Dec. 28, 1954 |